J. W. FARNOFF.
TIRE FASTENER.
APPLICATION FILED SEPT. 7, 1910.
981,182.
Patented Jan. 10, 1911.
2 SHEETS—SHEET 1.
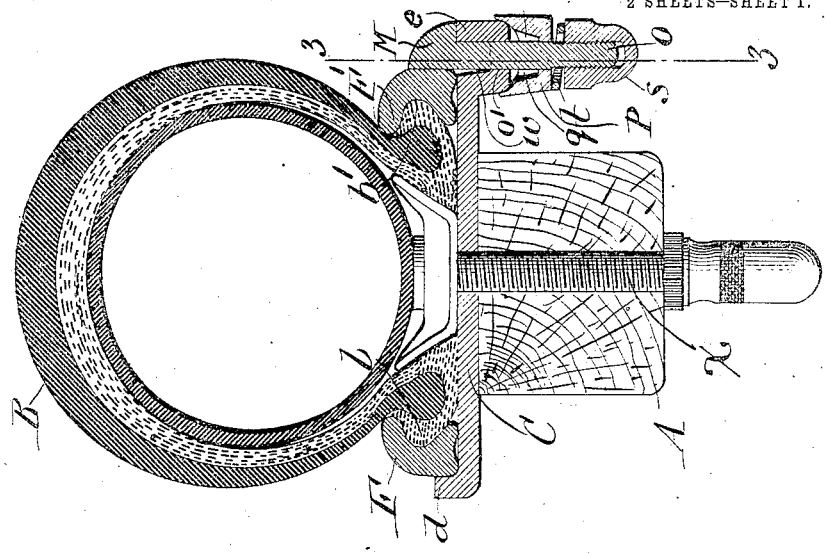
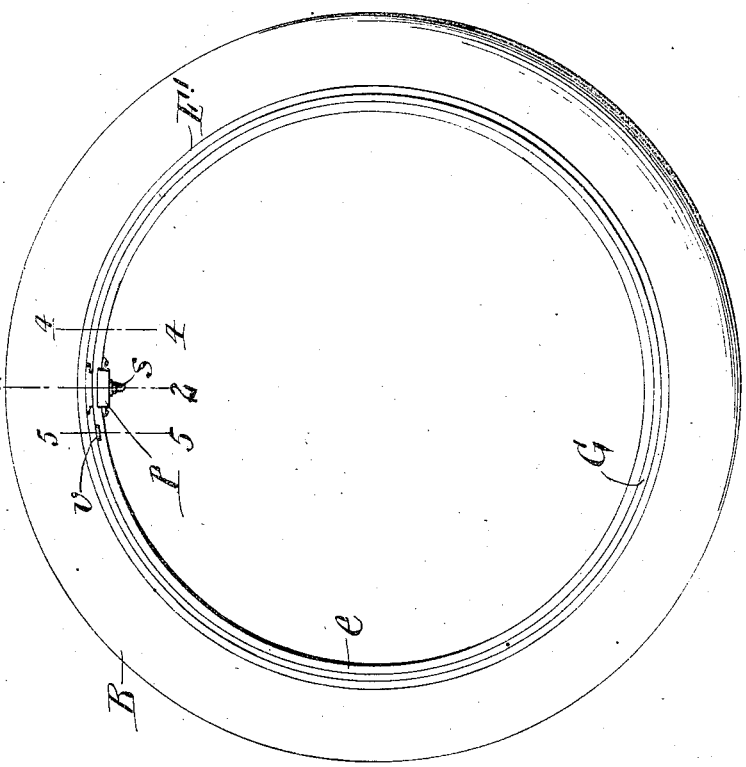
Witnesses:—
Alfred Borkenhagen
Richard Sommer
Inventor
Jay W. Farnoff
by Geyer & Topp
Attorneys

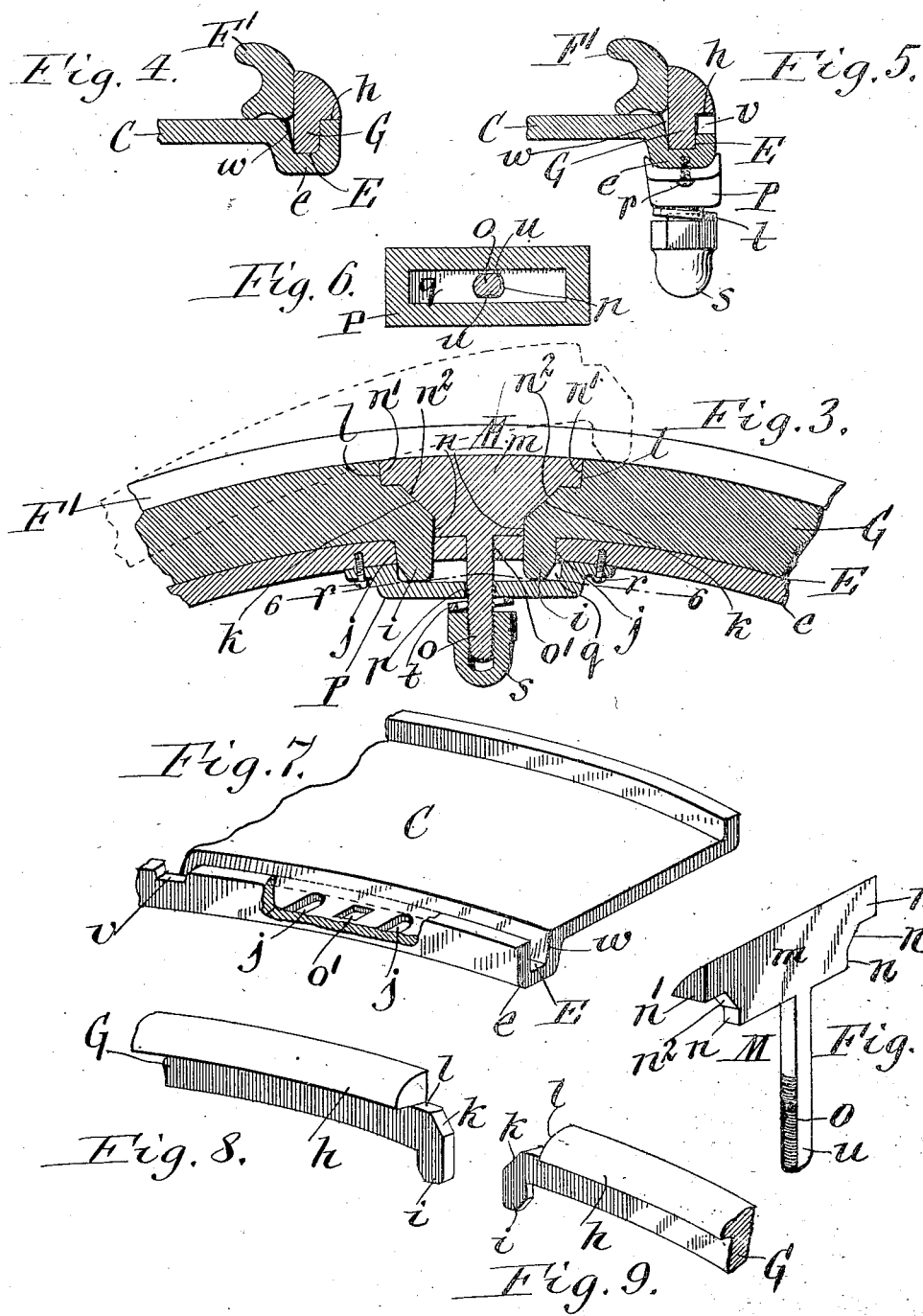

UNITED STATES PATENT OFFICE.

JAY W. FARNOFF. OF BUFFALO, NEW YORK, ASSIGNOR OF ONE-HALF TO WALTER J. REIMAN, OF BUFFALO, NEW YORK.

TIRE-FASTENER.

981,182.  Specification of Letters Patent.  Patented Jan. 10, 1911.

Application filed September 7, 1910. Serial No. 580,909.

*To all whom it may concern:*

Be it known that I, JAY W. FARNOFF, a citizen of the United States, residing at Buffalo, in the county of Erie and State of New York, have invented new and useful Improvements in Tire-Fasteners, of which the following is a specification.

This invention relates to a tire fastener and has for its object the production of simple and efficient means which permit of more easily securing the tire on the wheel and removing the same therefrom.

In the accompanying drawings consisting of 2 sheets: Figure 1 is a side elevation of a wheel rim and tire equipped with my improved fastener. Fig. 2 is a cross section, on an enlarged scale, taken in line 2—2, Fig. 1, with the addition of the felly of the wheel. Fig. 3 is a longitudinal section in line 3—3, Fig. 2. Figs. 4 and 5 are fragmentary transverse sections, on an enlarged scale, in the correspondingly numbered lines in Fig. 1. Fig. 6 is a horizontal section in line 6—6, Fig. 3. Fig. 7 is a fragmentary perspective view of the rim. Figs. 8 and 9 are fragmentary perspective views of the two ends of the split locking ring. Fig. 10 is a perspective view of the locking bolt.

Similar letters of reference indicate corresponding parts throughout the several views.

A represents the felly of the wheel and B the shoe of the tire which in this instance is provided with outwardly-projecting longitudinal beads or ribs $b$, $b^1$ on its opposite sides.

C represents the body of the rim which is of cylindrical form and secured to the outer side of the felly in any suitable manner. On one longitudinal edge of the body of the rim the same is provided with an outwardly-projecting annular stop flange $d$ and at its opposite edge the same is provided with an inwardly-depressed bead $e$ forming an outwardly-opening channel or groove E.

Upon the periphery of the rim body are arranged two hook-shaped fastening rings or flanges F, $F^1$, the inner one F of which engages with the inner side of the stop-flange $d$ while the outer one $F^1$ is arranged adjacent to the inner side of the channel E. These fastening flanges may be placed on the rim with their hooks facing each other and engaging with the beads of the tire, as shown in Fig. 2, or the same may be reversed so that their hooks face outwardly or away from each other for use on tires having shoes unprovided with beads.

G represents a locking ring whereby the outer fastening flange is held against lateral outward movement, so as to retain the tire in its operative position on the rim. This locking ring is split and is constructed of spring metal, so that it may be sprung into the channel of the rim. The height of the locking ring is such that when its inner part engages with the channel the outer part thereof projects outwardly alongside of the outer side of the adjacent outer fastening flange $F^1$ and thus holds the latter in engagement with the respective tire bead and prevents detachment of the tire while the parts are in this position. The outer part of the locking ring is provided with a laterally projecting bearing flange $h$ the inner side of which is straight and rests on the outer wall of the channel E while the outer side is beveled or rounded, as shown in Fig. 4. The outer side of the outer fastening flange $F^1$ is in line, or substantially so, with the inner wall of the channel and the locking ring does not project underneath said fastening flange as is the case in tire fasteners as heretofore constructed, thereby avoiding the necessity of first pushing the outer fastening flange inwardly to clear the locking ring, as has been necessary heretofore to permit of first removing the locking ring before it was possible to move the outer fastening flange laterally to free the adjacent side of the tire. It follows from this construction that the adjacent side of the tire and the respective fastening flange need not be pushed inwardly in the manner now commonly practiced for attaching or detaching the tire, which pushing operation is not only inconvenient but also very difficult on account of the presence of the usual stay bolts $x$ which fasten the base of the tire shoe to the rim and felly to avoid creeping.

The ends of the split locking ring are provided with inwardly projecting locking lugs $i$ which engage with a pair of openings $j$ in the bottom of the channel E, these lugs being preferably tapered inwardly, as shown in Figs. 3, 8 and 9 to facilitate the engagement of the same with said openings. On the outer part of each end of the split locking ring the same is provided with a beveled face $k$, the beveled faces $k$ of both ends of the split ring converging inwardly. At the outer end of each beveled face $k$ each end of the split ring is provided with a rabbeted seat $l$.

M represents a locking bolt the head $m$ of which has a narrow inner part provided with parallel ends $n$, a wide outer part provided with parallel ends and forming overhanging ears $n^1$ and an inwardly narrowing central part provided with inwardly converging sides $n^2$. The stem or shank $o$ of the locking bolt projects inwardly from the narrow inner part of the head. In the assembled condition of the parts the ears $n^1$ of the locking bolt engage with the seats $l$, the converging sides $n^2$ engage with the converging faces $k$, the parallel ends $n$ engage between the ends of the split ring adjacent to its locking lugs $i$ and the stem $o$ engages with an opening $o^1$ arranged in the bottom of the channel E between the pair of openings $j$. At its inner end the stem of the bolt passes through an opening $p$ formed in the bottom of a bridge piece P which is arranged on the underside of the channel and provided with a cavity $q$ which receives the lugs $i$. This bridge piece is preferably secured to the channel by screws $r$, as shown in Fig. 3, or otherwise, and if desired the same may be unattached to the channel. The locking bolt is held in place by a screw nut $s$ applied to the inner end of its stem and bearing against the underside of the bridge piece by means of a washer $t$, preferably of the spring type interposed between the nut $s$ and the bridge piece. Turning of the bolt is prevented by flattening opposite sides of its stem or shank, as shown at $u$, and constructing the opening $p$ in the bridge piece of corresponding form. While the locking bolt is in place the locking ring is held in the channel whereby the fastening flanges and tire are confined in the proper position on the rim.

For releasing the tire, the nut $s$ is first removed from the stem of the bolt, then the latter is withdrawn from between the ends of the locking ring and one end of the same is sprung outwardly sufficiently to disengage its locking lug from the channel. The locking lug on the other end of the locking ring is then disengaged from its opening and the ring removed laterally from the rim. When the split locking ring is removed from the rim one end thereof springs over the other end, as shown by full and dotted lines in Fig. 3. The lifting of the first end of the locking ring from the rim may be easily effected by inserting a tool, such as a screw driver, into a notch $v$ in the outer edge of the outer wall of the channel and underneath the bearing flange $h$ of the locking ring adjacent to the respective locking opening $j$. After the locking ring has been removed the adjacent outer fastening flange $F^1$ may be readily and easily moved laterally outward sufficiently to clear the bead on the adjacent side of the tire, thereby permitting the latter to be opened for the removal and insertion of the inner tube of the tire in a well known manner.

It will be noted that in this tire fastener the outer fastening flange does not interfere with the removal of the locking ring, nor is the latter liable to become stuck on the rim by rusting or freezing, thereby permitting the removal and restoration of the tire to be effected easily and quickly and at the same time insuring reliable attachment of the tire to the rim after the parts have been assembled. This rusting or freezing of the locking ring in the channel of the rim is further prevented by inclining the inner wall of this channel, as shown at $w$, Figs. 2, 4 and 5, so that the adjacent inner side of the locking ring does not come in contact therewith and therefore cannot become stuck in the channel.

In the use of this tire fastener it is unnecessary to first loosen the tire valve and stay bolts, inasmuch as these parts need not be disturbed for opening one side of the tire to permit removal and replacing of the inner tube. Furthermore, the locking ring is not liable to fly off when the same has been applied imperfectly, or when the tire has partially flattened owing to the loss of air.

I claim as my invention:

The combination of a rim adapted to receive a tire on its periphery and having an annular channel at one of its edges, the bottom of said channel having a bolt opening and a pair of locking openings on opposite sides of the bolt opening, a fastening flange arranged on the periphery of the rim and engaging the adjacent side of the tire, a split locking ring arranged in said channel and engaging the outer side of the fastening flange and provided at its ends with inwardly-projecting locking lugs which engage with said locking openings, beveled faces adjacent to said lugs and rabbeted seats at the outer ends of said beveled faces, and a locking bolt having its stem arranged in said bolt opening and having its head provided with a narrow inner part which engages with the ends of said ring adjacent to the lugs thereof, a wide outer part forming lugs which engage with said rabbeted seats, and an inwardly tapering central part which engages with said beveled faces.

Witness my hand this 6th day of September, 1910.

JAY W. FARNOFF.

Witnesses:
WALTER J. REIMAN,
THEO. L. POPP.